(12) United States Patent
Hwang et al.

(10) Patent No.: US 12,386,142 B2
(45) Date of Patent: Aug. 12, 2025

(54) CAMERA MODULE

(71) Applicant: LG INNOTEK CO., LTD., Seoul (KR)

(72) Inventors: Sun Min Hwang, Seoul (KR); Min Woo Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 857 days.

(21) Appl. No.: 17/615,398

(22) PCT Filed: May 26, 2020

(86) PCT No.: PCT/KR2020/006805
§ 371 (c)(1),
(2) Date: Nov. 30, 2021

(87) PCT Pub. No.: WO2020/242178
PCT Pub. Date: Dec. 3, 2020

(65) Prior Publication Data
US 2022/0229263 A1 Jul. 21, 2022

(30) Foreign Application Priority Data
May 31, 2019 (KR) .................. 10-2019-0064456
May 31, 2019 (KR) .................. 10-2019-0064457

(51) Int. Cl.
*G02B 7/02* (2021.01)
(52) U.S. Cl.
CPC ............. *G02B 7/028* (2013.01); *G02B 7/021* (2013.01)
(58) Field of Classification Search
CPC .......... G02B 7/02; G02B 7/021; G02B 7/022; G02B 7/023; G02B 7/025; G02B 7/026; G02B 7/027; G02B 7/028; H04N 23/52
See application file for complete search history.

(56) References Cited

U.S. PATENT DOCUMENTS

2015/0205186 A1 7/2015 Park et al.
2015/0217694 A1 8/2015 Bingle et al.
(Continued)

FOREIGN PATENT DOCUMENTS

CN 108983533 A 12/2018
CN 109076150 A 12/2018
(Continued)

OTHER PUBLICATIONS

International Search Report dated Aug. 28, 2020 in International Application No. PCT/KR2020/006805.
(Continued)

*Primary Examiner* — Ephrem Z Mebrahtu
(74) *Attorney, Agent, or Firm* — Saliwanchik, Lloyd & Eisenschenk

(57) ABSTRACT

A camera module according to one aspect of the present invention comprises: a housing including a body unit and an accommodation unit; an outermost lens arranged on the upper part of the accommodation unit; a substrate coupled to the lower part of the housing; a connector coupled to the lower surface of the substrate; a heating member arranged on one side of the outermost lens; and a transmission member for connecting the heating member and the connector, wherein the substrate includes a first groove formed on the side surface thereof so as to be penetrated by the transmission member, and the housing includes a partition wall extending from the lower surface thereof so as to be coupled to the upper surface of the substrate.

19 Claims, 12 Drawing Sheets

(56) References Cited

U.S. PATENT DOCUMENTS

| | | | |
|---|---|---|---|
| 2018/0084161 A1* | 3/2018 | Lee | G02B 7/028 |
| 2018/0239105 A1* | 8/2018 | Lee | H04N 23/55 |
| 2018/0255213 A1 | 9/2018 | Ahn et al. | |
| 2018/0343369 A1 | 11/2018 | Kim et al. | |
| 2018/0345911 A1* | 12/2018 | Zurowski | G03B 17/55 |
| 2018/0352120 A1 | 12/2018 | Zurowski et al. | |
| 2019/0137723 A1 | 5/2019 | Bernal et al. | |
| 2019/0137850 A1 | 5/2019 | Ha et al. | |
| 2019/0381939 A1* | 12/2019 | Rafalowski | G02B 27/0006 |
| 2021/0250472 A1* | 8/2021 | Liu | G03B 17/561 |
| 2021/0294066 A1* | 9/2021 | Hirata | H05B 1/0288 |

FOREIGN PATENT DOCUMENTS

| | | |
|---|---|---|
| EP | 3 951 494 A1 | 2/2022 |
| JP | 2004-325603 A | 11/2004 |
| KR | 10-2017-0021088 A | 2/2017 |
| KR | 10-2017-0023664 A | 3/2017 |
| KR | 10-2017-0032585 A | 3/2017 |
| KR | 10-2018-0017590 A | 2/2018 |
| KR | 10-1851146 B1 | 4/2018 |
| KR | 10-2018-0093487 A | 8/2018 |

OTHER PUBLICATIONS

Office Action dated Nov. 10, 2022 in Chinese Application No. 202080039964.0.
Supplementary European Search Report dated Jun. 5, 2023 in European Application No. 20814116.8.
Office Action dated Mar. 19, 2024 in Japanese Application No. 2021-570894.

\* cited by examiner

CAMERA MODULE

CROSS-REFERENCE TO RELATED APPLICATIONS

This application is the U.S. national stage application of International Patent Application No. PCT/KR2020/006805, filed May 26, 2020, which claims the benefit under 35 U.S.C. § 119 of Korean Application Nos. 10-2019-0064456, filed May 31, 2019; and 10-2019-0064457, filed May 31, 2019; the disclosures of each of which are incorporated herein by reference in their entirety.

TECHNICAL FIELD

The present embodiment relates to a camera module.

BACKGROUND ART

In recent years, micro-camera modules have been developed, and micro-camera modules are widely used in small electronic products such as smart phones, notebook computers, and game consoles.

As automobiles become more popular among public, micro-cameras are widely used not only in small electronic products but also in vehicles. For example, a black box camera for the protection of a vehicle or objective data of a traffic accident, a rear surveillance camera that enables the driver to monitor the blind spot at the rear of the vehicle through the screen to ensure safety when the vehicle is reversing, a surrounding detection camera that can monitor the surroundings of the vehicle, and the like are provided.

The camera may include a lens, a lens holder accommodating the lens, an image sensor for converting an image of a subject collected in the lens into an electrical signal, and a printed circuit board on which the image sensor is mounted. The housing constituting the outer shape of the camera has a structure in which the entire region is sealed in order to inhibit contamination of internal parts from foreign substances including moisture.

Due to the characteristics of a vehicle that is disposed outdoors, the temperature inside and outside the vehicle forms a variety of distributions depending on the time. For example, in summer, the indoor temperature may be higher than the outdoor temperature, and in winter, the temperature may drop to below zero. Accordingly, condensation including frost may occur in the components including the lens and glass of the camera according to an abrupt temperature change. For this reason, satisfactory image recordings may not be obtained, or may cause a product failure.

DETAILED DESCRIPTION OF THE INVENTION

Technical Subject

An object to be solved by the present invention is to provide a camera module capable of inhibiting condensation including frost from occurring on a lens.

Technical Solution

A camera module according to one aspect of the present invention comprises: a housing including a body and an accommodation unit extending in an optical axis direction from a central region of the body; an outermost lens arranged on the upper part of the accommodation unit; a substrate coupled to the lower part of the housing; a connector coupled to a lower surface of the substrate; a heating member arranged on one side of the outermost lens; and a transmission member for connecting the heating member and the connector, wherein the substrate includes a first groove formed on the side surface thereof so as to be penetrated by the transmission member, and the housing includes a partition wall extending from the lower surface thereof so as to be coupled to the upper surface of the substrate.

In addition, the partition wall may be overlapped with the edge region of an upper surface of the substrate in the optical axis direction.

In addition, the edge region of the upper surface of the substrate may be in contact with a lower surface of the partition wall, and an upper surface of the substrate may be sealed from the outside by the partition wall.

In addition, the accommodation unit may include a hole extending in an optical axis direction, and the transmission member may sequentially pass through the hole and the first groove to be connected to the connector.

In addition, at least one lens arranged in the accommodation unit and arranged on one side of the outermost lens is included, the hole is spaced apart from the at least one lens in a direction perpendicular to the optical axis, and the at least one lens may be screw-coupled to the inner circumferential surface of the accommodation unit.

In addition, the accommodation unit may include a second groove formed on a lower surface, and the second groove may be overlapped with the at least one lens in a direction perpendicular to the optical axis.

In addition, the transmission member may include a first region connected to the heating member, a second region connected to the connector, and a third region connecting the first region and the second region.

In addition, at least a portion of the third region of the transmission member may be bent.

In addition, a retainer coupled to an upper portion of the accommodation unit to fix the outermost lens may be included.

In addition, an O-ring arranged between the outermost lens and the retainer may be included.

A camera module according to an aspect of the present invention for achieving the above object includes: a housing including a body and an accommodation unit extending in an optical axis direction from a central region of the body; an outermost lens arranged on an upper part of the accommodation unit; a substrate coupled to a lower part of the housing; a heating member arranged on one side of the outermost lens; and a transmission member connecting the heating member and the substrate, wherein the accommodation unit includes a hole extending in an optical axis direction, and the substrate includes a first groove formed concave inwardly from a side surface, and the transmission member passes through the hole and the first groove.

In addition, the housing may include a partition wall extending downward from a lower surface and coupled to an upper surface of the substrate.

In addition, the partition wall may be overlapped with the edge region of an upper surface of the substrate in the optical axis direction.

In addition, the edge region of an upper surface of the substrate may be in contact with a lower surface of the partition wall, and an upper surface of the substrate may be sealed from the outside by the partition wall.

In addition, at least one lens arranged on the accommodation unit and arranged on one side of the outermost lens is included, the hole is spaced apart in a direction perpendicular to the optical axis, and the at least one lens may be screw-coupled to the inner circumferential surface of the accommodation unit.

In addition, the accommodation unit may include a second groove formed on a lower surface, and the second groove may be overlapped with the at least one lens in a direction perpendicular to the optical axis.

In addition, a connector arranged on a lower surface of the board is included, and one side of the transmission member may be connected to the connector.

In addition, the transmission member may include a first region connected to the heating member, a second region connected to the connector, and a third region connecting the first region and the second region.

In addition, at least a portion of the third region of the transmission member may be bent.

A retainer coupled to an upper part of the accommodation unit to fix the outermost lens; and an O-ring arranged between the outermost lens and the retainer may be included.

A camera module according to an aspect of the present invention for achieving the above object comprises: a housing including a body and an accommodation unit extending from a central region of the body in an optical axis direction; an outermost lens arranged on an upper part of the accommodation unit; a substrate coupled to a lower part of the housing; a connector coupled to a lower surface of the board; a heating member arranged on one side of the outermost lens; and a transmission member connecting the heating member and the connector, wherein the substrate includes a groove formed on a side surface and penetrated by the transmission member, and wherein the housing includes a partition wall extending from a lower surface and coupled to an upper surface of the substrate.

In addition, the partition wall may overlap the edge region of an upper surface of the substrate in the optical axis direction.

In addition, the edge region of an upper surface of the substrate may be in contact with a lower surface of the partition wall, and an upper surface of the substrate may be sealed from the outside by the partition wall.

In addition, the partition wall may include a hole penetrated by the transmission member.

In addition, the transmission member may include a first region connected to the heating member, a second region connected to the connector, and a third region connecting the first region and the second region and penetrating through the hole.

In addition, at least a portion of the third region may be bent.

In addition, the hole may be sealed by a sealing member after being penetrated by the transmission member.

In addition, at least one lens arranged in the accommodation unit; and a spacer arranged between the inner side surface of the accommodation unit and the at least one lens.

In addition, a fixing member arranged below the spacer and coupled to the inner side surface of the accommodation unit may be included.

In addition, the outer side surface of the fixing member may be screw-coupled to the inner side surface of the accommodation unit.

In addition, a separation space formed between the inner surface of the accommodation unit and the spacer is included, and the transmission member may penetrate the separation space.

In addition, an O-ring arranged between the inner surface of the accommodation unit and the outermost lens may be included.

A camera module according to an aspect of the present invention for achieving the above object comprises: a housing including a body and an accommodation unit extending from a central region of the body in an optical axis direction; an outermost lens arranged on an upper part of the accommodation unit; a substrate coupled to a lower part of the housing; a heating member arranged on one side of the outermost lens; a transmission member connecting the heating member and the substrate; at least one lens arranged in the accommodation unit; and a spacer arranged between the inner surface of the accommodation unit and the at least one lens, wherein the substrate includes a groove formed concave inwardly on a side surface, and wherein the transmission member passes through the groove and a separation space formed between the inner surface of the accommodation unit and the spacer.

In addition, the housing may include a partition wall extending from a lower surface and coupled to an upper surface of the substrate.

In addition, the edge region of an upper surface of the substrate is in contact with a lower surface of the partition wall, and an upper surface of the substrate may be sealed from the outside by the partition wall.

In addition, the partition wall may include a hole penetrated by the transmission member.

In addition, the transmission member may include a first region connected to the heating member, a second region connected to the connector, and a third region connecting the first region and the second region and penetrating through the hole.

In addition, at least a portion of the third region may be bent.

In addition, the hole may be sealed by a sealing member after being penetrated by the transmission member.

In addition, a fixing member arranged below the spacer and coupled to the inner side surface of the accommodation unit is included, and the outer side surface of the fixing member may be screw-coupled to the inner side surface of the accommodation unit.

A camera module according to an aspect of the present invention for achieving the above object comprises: a housing including a body and an accommodation unit extending from a central region of the body in an optical axis direction; an outermost lens arranged on an upper part of the accommodation unit; a substrate coupled to a lower part of the housing; a heating member arranged on one side of the outermost lens; a transmission member connecting the heating member and the substrate; at least one lens arranged in the accommodation unit; and a spacer arranged between the inner surface of the accommodation unit and the at least one lens, wherein the housing includes a partition wall extending from a lower surface and coupled to an upper surface of the substrate, wherein the partition wall includes a hole, and wherein the transmission member passes through the hole and a separation space formed between the inner surface of the accommodation unit and the spacer.

Advantageous Effects

Through the present embodiment, it is possible to provide a camera module capable of inhibiting condensation including frost from occurring on the lens.

BEST MODE

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (including technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may include the plural form unless specifically stated in the phrase, and when described as "at least one (or more than one) of A and B and C", it may include one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also include cases of being 'connected', 'coupled', or 'interconnected' due that another component between that other components.

In addition, when described as being formed or arranged in "on (above)" or "below (under)" of each component, "on (above)" or "below (under)" means that it includes not only the case where the two components are directly in contact with, but also the case where one or more other components are formed or arranged between the two components. In addition, when expressed as "on (above)" or "below (under)", the meaning of not only an upward direction but also a downward direction based on one component may be included.

An 'optical axis direction' used below is defined as an optical axis direction of a lens module. Meanwhile, the 'optical axis direction' may correspond to an 'up-down direction', a 'z-axis direction', and the like.

Hereinafter, the present invention will be described in more detail with reference to the accompanying drawings.

Figure 1:
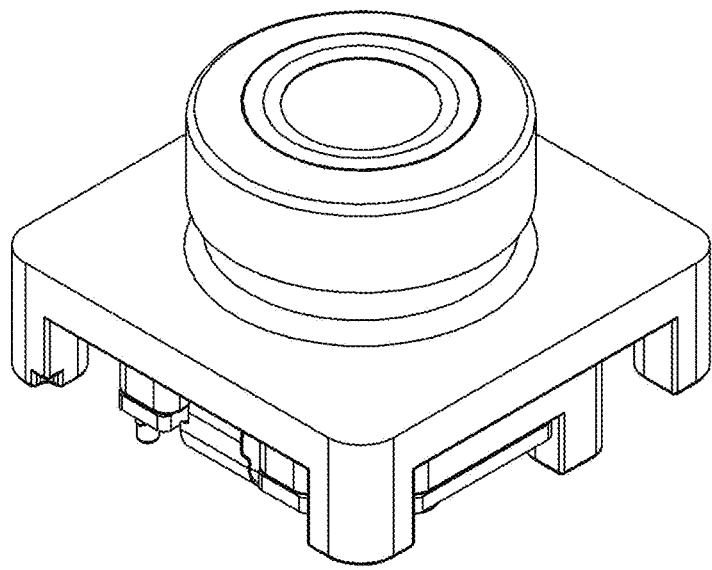
FIG. 1 is a perspective view of a camera module according to a first embodiment of the present invention.
Figure 2:
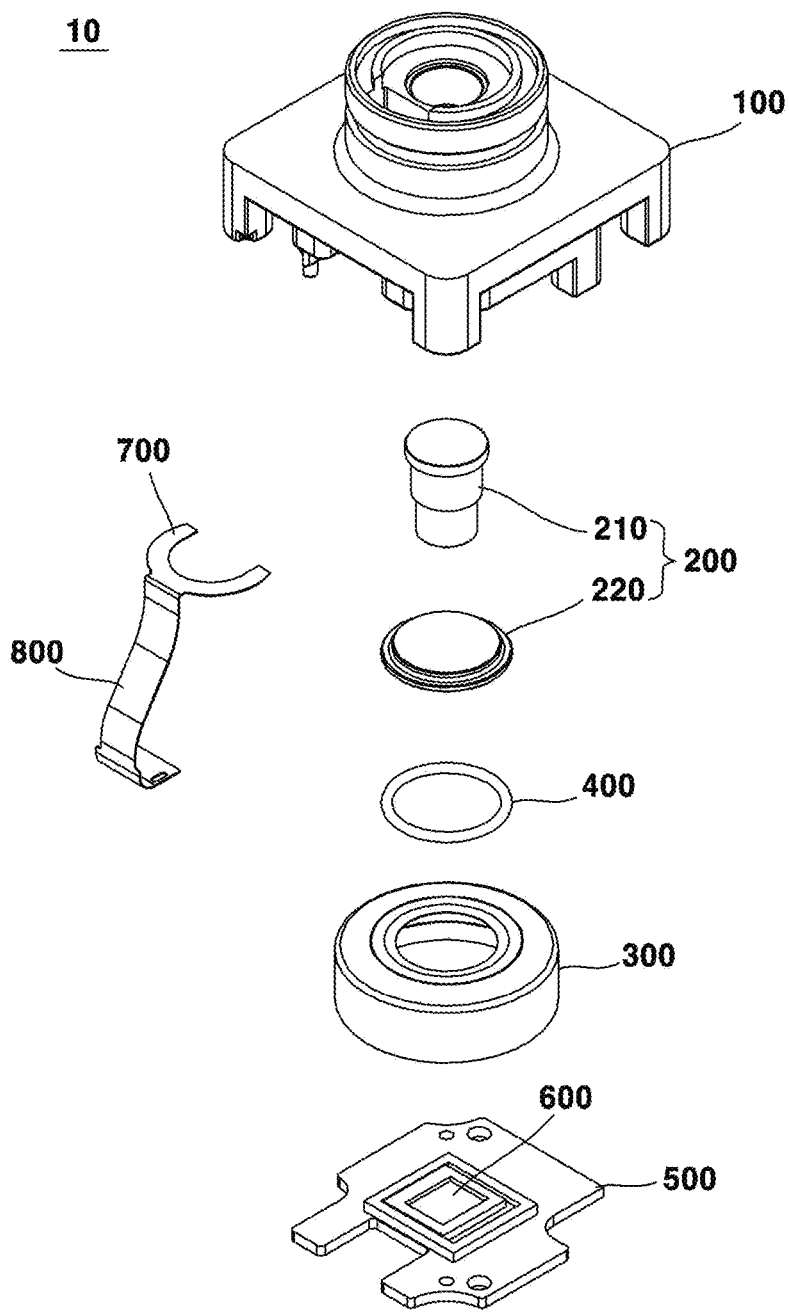
FIG. 2 is an exploded perspective view of a camera module according to a first embodiment of the present invention.
Figure 3:
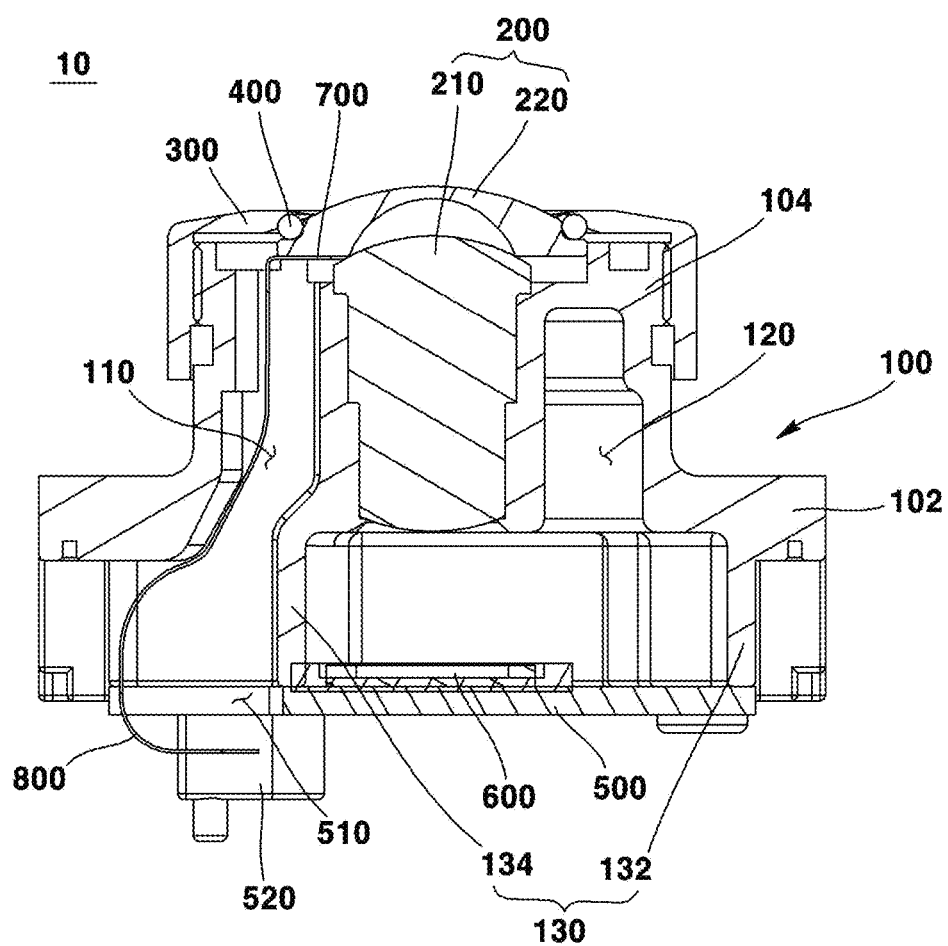
FIG. 3 is a cross-sectional view of a camera module according to a first embodiment of the present invention.
Figure 4:
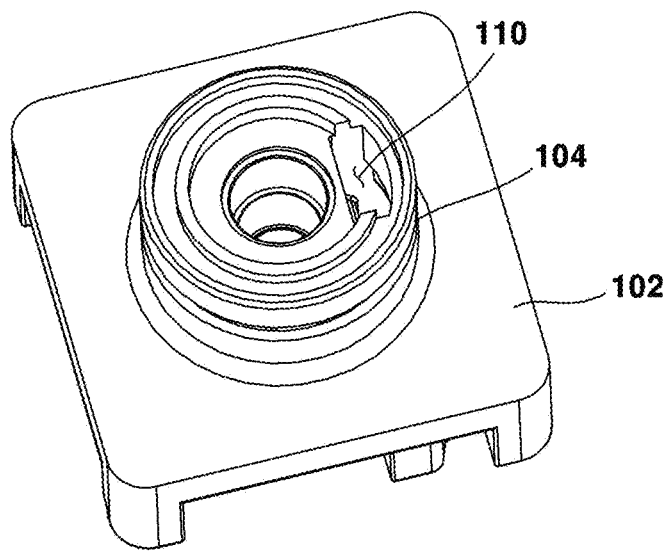
FIGS. 4 to 6 are perspective views of a housing according to a first embodiment of the present invention.
Figure 5:
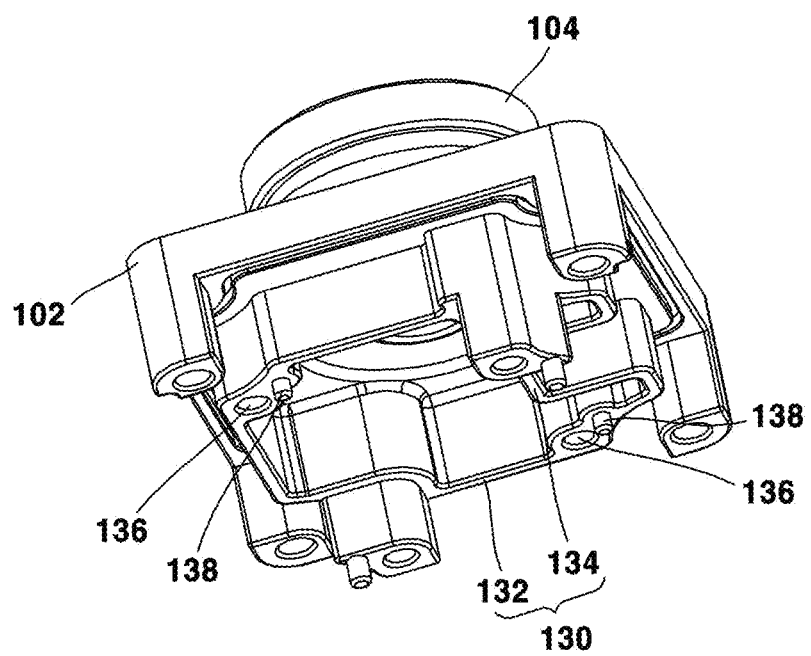
Figure 6:
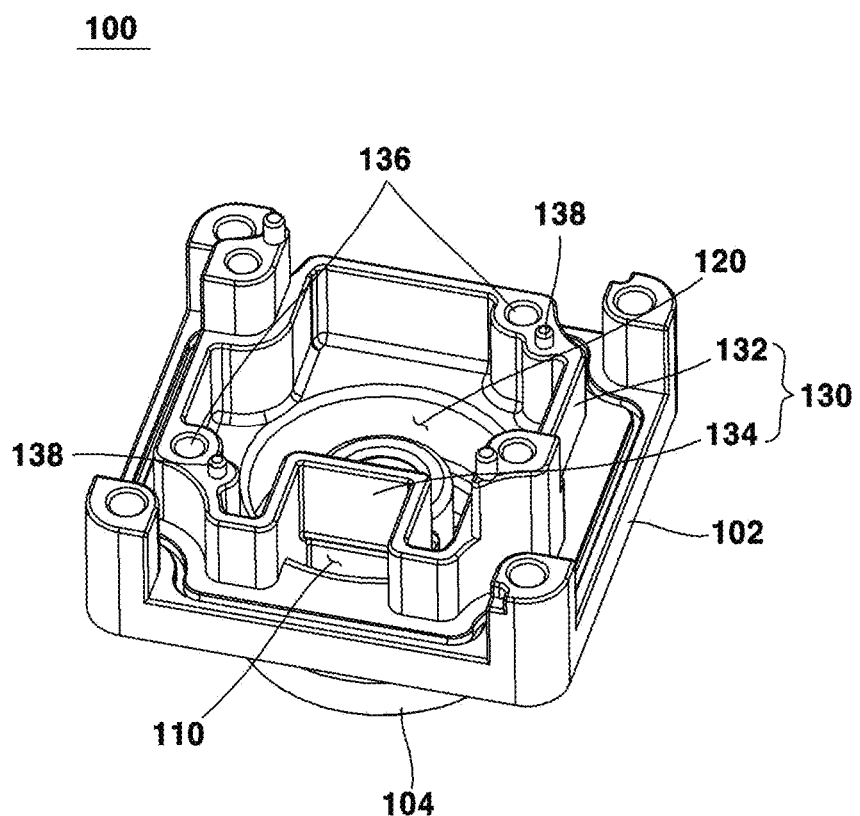
Figure 7:
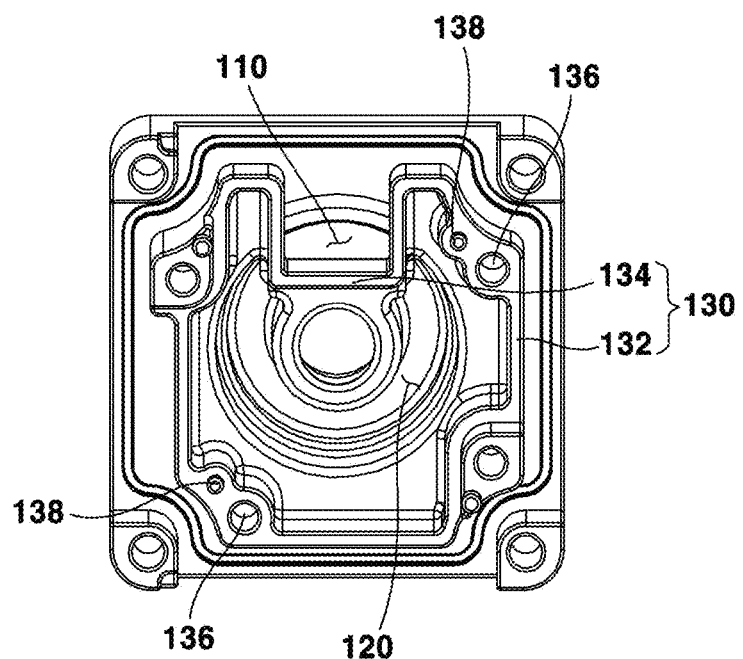
FIG. 7 is a bottom view of the housing according to a first embodiment of the present invention.
Figure 8:
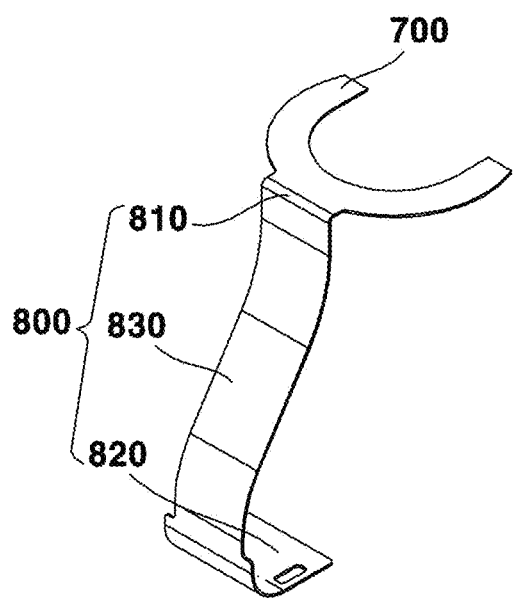
FIG. 8 is a perspective view of a heating member and a transmission member according to a first embodiment of the present invention.
Figure 9:
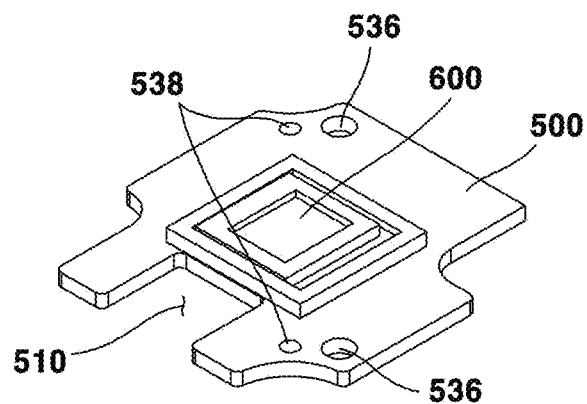
FIG. 9 is a perspective view of a substrate and an image sensor according to a first embodiment of the present invention.

FIG. 1 is a perspective view of a camera module according to a first embodiment of the present invention. FIG. 2 is an exploded perspective view of a camera module according to a first embodiment of the present invention. FIG. 3 is a cross-sectional view of a camera module according to a first embodiment of the present invention. FIGS. 4 to 6 are perspective views of a housing according to a first embodiment of the present invention. FIG. 7 is a bottom view of the housing according to a first embodiment of the present invention. FIG. 8 is a perspective view of a heating member and a transmission member according to a first embodiment of the present invention. FIG. 9 is a perspective view of a substrate and an image sensor according to a first embodiment of the present invention.

Referring to FIGS. 1 to 9, the camera module 10 according to the first embodiment of the present invention may include a housing 100, a lens module 200, a retainer 300, an O-ring 400, a substrate 500, an image sensor 600, a heating member 700, and a transmission member 800, but may be implemented except for some of these configurations and does not exclude additional configurations other than that.

The camera module 10 according to the first embodiment of the present invention may include a housing 100. The housing 100 may form the outer appearance of the camera module 10. In the housing 100, a lens module 200, a retainer 300, an O-ring 400, a substrate 500, an image sensor 600, a heating member 700, and a transmission member 800 may be arranged. The housing 100 may be combined with an additional housing (not shown) arranged on a lower part. The housing 100 may be arranged below the retainer 300. The housing 100 may include a body 102, an accommodation unit 104, and a partition wall 130.

The housing 100 may include a body 102. The body 102 may form the outer appearance of the camera module 10. The body 102 may be formed in a hexahedral shape with an open lower surface. An accommodation unit 104 may be formed in the body 102. An accommodation unit 104 may be formed in the central region of the body 102. The body 102 may be integrally formed with the accommodation unit 104. The body 102 may be combined with an additional housing being arranged on a lower part. The body 102 may be formed with a first partition wall 132 on the lower part.

The housing 100 may include an accommodation unit 104. The accommodation unit 104 may be formed being extended from the body 102. The accommodation unit 104 may be formed in the central region of the body 102. The accommodation unit 104 may be extended in the optical axis direction. The accommodation unit 104 may be formed integrally with the body 102.

The accommodation unit 104 may be formed in a cylindrical shape. The accommodation unit 104 may include an opening, a hole 110, and a second groove 120. A second partition wall 134 may be formed in the lower part of the accommodation unit 104.

The accommodation unit 104 may include an opening. An opening being extended in the optical axis direction may be formed in the central region of the accommodation unit 104. The lens module 200 may be arranged in the accommodation unit 104. The lens module 200 may be arranged in the opening of the accommodation unit 104. At least one lens 210 may be arranged in the opening of the accommodation unit 104. The at least one lens 210 may be screw-coupled to the inner circumferential surface of the opening of the accommodation unit 104. An outermost lens 220 may be arranged in the upper part region of the accommodation unit 104. The upper part of the opening of the accommodation unit 104 may be sealed by the outermost lens 220. The outermost lens 220 may be exposed to the upper part of the accommodation unit 104.

The accommodation unit 104 may include a hall 110. The hole 110 may be extended in the optical axis direction. The hole 110 may be spaced apart from the opening of the accommodation unit 104 in a direction perpendicular to the optical axis. The hall 110 may be located in some region based on the cross-section of the accommodation unit 104. The hole 110 may be penetrated by the transmission member 800. The hole 110 may be overlapped with at least one lens 210 in a direction perpendicular to the optical axis. The hole 110 may not be overlapped with the image sensor 600 arranged on the upper surface of the substrate 500 in the optical axis direction.

The accommodation unit 104 may include a second groove 120. The second groove 120 may be formed on the lower surface of the accommodation unit 104. The second groove 120 may be concave upwards on the lower surface of the accommodation unit 104. The second groove 120 may be extended in the optical axis direction. The second groove 120 may be overlapped with at least one lens 210 in a direction perpendicular to the optical axis. The second groove 120 may be spaced apart from the hole 110. The second groove 120 may be overlapped with the hole 110 in a direction perpendicular to the optical axis. Through this, it is possible to reduce the cost by reducing raw materials of the camera module 10 and reducing the weight.

The housing 100 may include a partition wall 130. The partition wall 130 may be formed in the lower part of the housing 100. The partition wall 130 may be protruded downward from the lower surface of the housing 100. The partition wall 130 may be coupled to the upper surface of the substrate 500. The lower surface of the partition wall 130 may be coupled to the upper surface of the substrate 500. The partition wall 130 may be overlapped with the edge region of the substrate 500 in the optical axis direction. The lower surface of the partition wall 130 may be in contact with the edge region of the substrate 500. The lower surface of the partition wall 130 may be formed in a shape corresponding to the edge region of the substrate 500. The partition wall 130 may seal the upper surface of the substrate 500 from the outside. Through this, it is possible to inhibit foreign substances from penetrating into the image sensor 600 or other elements. The partition wall 130 may include a first partition wall 132, a second partition wall 134, a first coupling hole 136, and a boss 138.

The partition wall 130 may include a first partition wall 132. The first partition wall 132 may be formed in the lower part of the body 102. The first partition wall 132 may be protruded downward from the lower surface of the body 102. The first partition wall 132 may be coupled to the upper surface of the substrate 500. The first partition wall 132 may be connected to the second partition wall 134. The first partition wall 132 may be integrally formed with the second partition wall 134. The first partition wall 132 may be in contact with the edge region of the upper surface of the substrate 500.

The partition wall 130 may include a second partition wall 134. The second partition wall 134 may be formed in the lower part of the accommodation unit 104. The second partition wall 134 may be protruded downward from the lower surface of the accommodation unit 104. The second partition wall 134 may be coupled to the upper surface of the substrate 500. The second partition wall 134 may be connected to the first partition wall 132. The second partition wall 134 may be integrally formed with the first partition wall 132. The second partition wall 134 may be in contact with a region adjacent to the first groove 510 among edge regions of the upper surface of the substrate 500.

The partition wall 130 may include a first coupling hole 136. The first coupling hole 136 may be formed on the lower surface of the partition wall 130. The first coupling hole 136 may be overlapped with the second coupling hole 536 formed in the substrate 500 in the optical axis direction. The first coupling hole 136 may be formed in a shape corresponding to the second coupling hole 536 formed in the substrate 500. The first coupling hole 136 may be penetrated through by a coupling member, for example, a screw, together with the second coupling hole 536 formed in the substrate 500. Through this, the lower surface of the partition wall 130 may be coupled to the upper surface of the substrate 500. The first coupling hole 136 may include two first coupling holes 136. The two first coupling holes 136 may be formed at positions symmetrical to each other with respect to the optical axis. Through this, coupling stability between the lower surface of the partition wall 130 and the upper surface of the substrate 500 may be enhanced.

The partition wall 130 may include a boss 138. The boss 138 may be formed on the lower surface of the partition wall 130. The boss 138 may be overlapped with the through hole 538 formed in the substrate 500 in the optical axis direction. The boss 138 may be formed in a shape corresponding to the through hole 538 formed in the substrate 500. The boss 138 may be inserted into the through hole 538 formed in the substrate 500. Through this, it is possible to guide the positioning of the housing 100 and the substrate 500 with respect to each other. The boss 138 may include two bosses 138. The two bosses 138 may be formed at positions symmetrical to each other with respect to the optical axis. Through this, the positioning force of the housing 100 and the substrate 500 with respect to each other may be enhanced.

The camera module 10 according to the first embodiment of the present invention may include a lens module 200. The lens module 200 may be arranged in the housing 100. The lens module 200 may be arranged in the accommodation unit 104 of the housing 100. The lens module 200 may be arranged in an opening of the accommodation unit 104 of the housing 100. The lens module 200 may include at least one lens 210 and an outermost lens 220.

The lens module 200 may include at least one lens 210. The at least one lens 210 may be arranged in the accommodation unit 104. The at least one lens 210 may be screw-coupled to the inner circumferential surface of the accommodation unit 104. The at least one lens 210 may be arranged on one side or below the outermost lens 220. The at least one lens 210 may be overlapped with the hole 110 of the accommodation unit 104 in a direction perpendicular to the optical axis. The at least one lens 210 may be overlapped with the second groove 120 of the accommodation unit 104 in a direction perpendicular to the optical axis. Each lens of the at least one lens 210 may be made of a synthetic resin material, a glass material, or a quartz material, but is not limited thereto and may be made of various materials.

The lens module 200 may include an outermost lens 220. The outermost lens 220 may be arranged on the upper part of the accommodation unit 104. The outermost lens 220 may seal the opening of the accommodation unit 104. The outermost lens 220 may be fixed to the accommodation unit 104 by the retainer 300. The outermost lens 220 may be made of a synthetic resin material, a glass material, or a quartz material, but is not limited thereto and may be made of various materials.

The camera module 10 according to the first embodiment of the present invention may include a retainer 300. The retainer 300 may be coupled to the housing 100. The retainer 300 may be coupled to the upper part of the accommodation unit 104 of the housing 100. The retainer 300 may secure the outermost lens 220. After the outermost lens 220 and the at least one lens 210 are inserted from the upper part of the accommodation unit 104 and assembled in the accommodation unit 104, the retainer 300 is coupled to the upper part of the accommodation unit 104 to fix the outermost lens 220 to the accommodation unit 104. At this time, one end of the retainer 300 is formed in a letter 'ㄱ' shape, so that the outermost lens 220 accommodated in the accommodation unit 104 can be fixed by pressing it downward. The other end of the retainer 300 may be snap-fit or screw-coupled to the outer circumferential surface of the accommodation unit 104. The other end of the retainer 300 may be coupled to the accommodation unit 104 through an adhesive member such as epoxy.

The camera module 10 according to the first embodiment of the present invention may include an O-ring 400. The O-ring 400 may be arranged between the lens module 200 and the retainer 300. The O-ring 400 may be arranged between the outermost lens 220 and the retainer 300. The O-ring 400 may be formed of a material having elasticity. The O-ring 400 may be formed in a ring shape. Through this, it is possible to prevent damage to components that may occur when the retainer 300 presses the outermost lens 220 of the lens module 200 downward.

The camera module 10 according to the first embodiment of the present invention may include a substrate 500. The substrate 500 may be arranged in the housing 100. The substrate 500 may be arranged on the lower part of the housing 100. The substrate 500 may be coupled to the lower part of the housing 100. The substrate 500 may be coupled to the lower surface of the partition wall 130 of the housing 100. The edge region of the upper surface of the substrate 500 may be overlapped with the partition wall 130 in the optical axis direction. The edge region of the upper surface of the substrate 500 may be in contact with the lower surface of the partition wall 130. The upper surface of the substrate 500 may be sealed from the outside by the partition wall 130. Through this, it is possible to inhibit foreign substances from penetrating into the image sensor 600 or other elements arranged on the upper surface of the substrate 500.

The substrate 500 may be electrically connected to an image sensor 600. The image sensor 600 may be arranged on the substrate 500. The image sensor 600 may be arranged on the upper surface of the substrate 500. The image sensor 600 may be mounted on the upper surface of the substrate 500. The substrate 500 may be electrically connected to the transmission member 800. The substrate 500 may be electrically connected to a connector 520. The connector 520 may be arranged on the lower surface of the substrate 500. The connector 520 may be mounted on the lower surface of the substrate 500. The substrate 500 may be electrically connected to the transmission member 800 through the connector 520.

The substrate 500 may include a printed circuit board (PCB). The substrate 500 may include a flexible printed circuit board (FPCB).

The substrate 500 may include a first groove 510. The first groove 510 may be formed on a side surface of the substrate 500. The first groove 510 may be concavely formed on the side surface of the substrate 500. The first groove 510 may be spaced apart from the image sensor 600. The first groove 510 may be penetrated by the transmission member 800. A cross-section of the first groove 510 may be formed in a rectangular shape. At least a portion of the first groove 510 may be overlapped with the hole 110 of the housing 100 in the optical axis direction. The first groove 510 may be located outside the partition wall 130. Specifically, the first groove 510 may be located outside the second partition wall 134.

The substrate 500 may include a second coupling hole 536. The second coupling hole 536 may be formed through the substrate 500. The second coupling hole 536 may be overlapped with the first coupling hole 136 formed in the partition wall 130 in the optical axis direction. The second coupling hole 536 may be formed in a shape corresponding to the first coupling hole 136 formed in the partition wall 130. The second coupling hole 536 may be penetrated through by a coupling member, for example, a screw, together with the first coupling hole 136 formed in the partition wall 130. Through this, the upper surface of the substrate 500 may be coupled to the lower surface of the partition wall 130. The second coupling hole 536 may include two second coupling holes 536. The two second coupling holes 536 may be formed at positions symmetrical to each other with respect to the optical axis. Through this, bonding stability between the upper surface of the substrate 500 and the lower surface of the partition wall 130 may be enhanced.

The substrate 500 may include a through hole 538. The through hole 538 may be formed by penetrating through the substrate 500. The through hole 538 may be overlapped with the boss 138 formed in the partition wall 130 in the optical axis direction. The through hole 538 may be formed in a shape corresponding to the boss 138 formed in the partition wall 130. The through hole 538 may be penetrated by the boss 138 formed in the partition wall 130. Through this, it is possible to guide the positioning of the housing 100 and the substrate 500 with respect to each other. The through hole 538 may include two through holes 538. The two through-holes 538 may be formed at positions symmetrical to each other with respect to the optical axis. Through this, the positioning force of the housing 100 and the substrate 500 with respect to each other may be enhanced.

A camera module 10 according to the first embodiment of the present invention may include an image sensor 600. The image sensor 600 may be arranged on the upper surface of the substrate 500. The image sensor 600 may be mounted in a central region of the upper surface of the substrate 500. The image sensor 600 may be arranged below the lens module 200. The image sensor 600 may be spaced apart from the first groove 510. The image sensor 600 may be electrically connected to the substrate 500. For example, the image sensor 600 may be coupled to the substrate 500 by a surface mounting technology (SMT). As another example, the image sensor 600 may be coupled to the substrate 500 by a flip chip technology.

The camera module 10 according to the first embodiment of the present invention may include a heating member 700. The heating member 700 may be arranged in the lens module 200. The heating member 700 may be arranged on one side of the outermost lens 220. The heating member 700 may be arranged on the lower surface of the outermost lens 220. The heating member 700 may be formed of a transparent material. The heating member 700 may be formed in a shape that does not interfere with light passing through the lens module 200. For example, the heating member 700 may be formed in a C-shape.

The heating member 700 may be electrically connected to the transmission member 800. The heating member 700 may receive power from the substrate 500 through the transmission member 700 to generate heat. The heating member 700 may be a transparent heating film coated with indium thin oxide (ITO) having conductivity capable of generating heat by a self-resistance component. The heating member 700 may be formed by, for example, a coating process or a deposition process of an indium tin oxide material. However, this is an example, and the material of the heating member 700 is not limited thereto, and may be variously changed as long as it is a material that can generate heat by supplying current.

The camera module 10 according to the first embodiment of the present invention may include a transmission member 800. The transmission member 800 may electrically connect the heating member 700 and the substrate 500. The transmission member 800 may connect the heating member 700 and the connector 520. The transmission member 800 may be electrically connected to the heating member 700. The transmission member 800 may be electrically connected to the substrate 500 through a connector 520. The transmission member 800 may supply current from the substrate 500 to the heating member 700. At least a portion of the transmission member 800 may be bent. The transmission member 800 may sequentially pass through the hole 110 of the accommodation unit 104 and the first groove 510 of the substrate 500. The transmission member 800 may be a flexible printed circuit board (FPCB).

The transmission member 800 may include a first region 810 connected to the heating member 700, a second region 820 connected to the connector 520, and a third region 830 connecting the first region 810 to the second region 820. At least a portion of the third region 830 may be bent. The third region 830 may sequentially pass through the hole 110 of the accommodation unit 104 and the first groove 510 of the substrate 500. Through this, space efficiency can be enhanced.

According to a camera module 10 according to the first embodiment of the present invention, it is possible to inhibit the occurrence of condensation including frost on the outermost lens 220 through the heating member 700.

In addition, according to a camera module 10 according to the first embodiment of the present invention, it is possible to inhibit a foreign material from penetrating into the image sensor 600 through the partition wall 130, and the space efficiency can be enhanced.

Hereinafter, a second embodiment of the present invention will be described in more detail with reference to the accompanying drawings.

Figure 10:
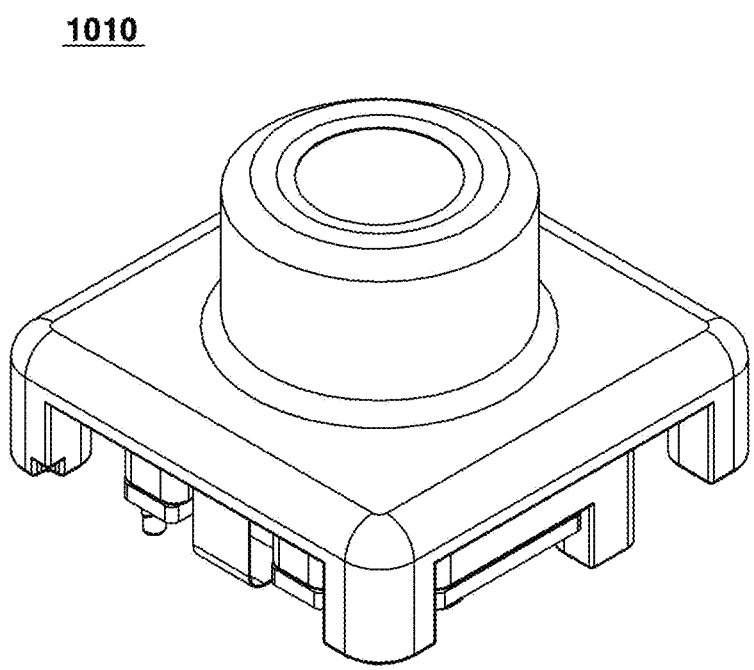
FIG. 10 is a perspective view of a camera module according to a second embodiment of the present invention.
Figure 11:
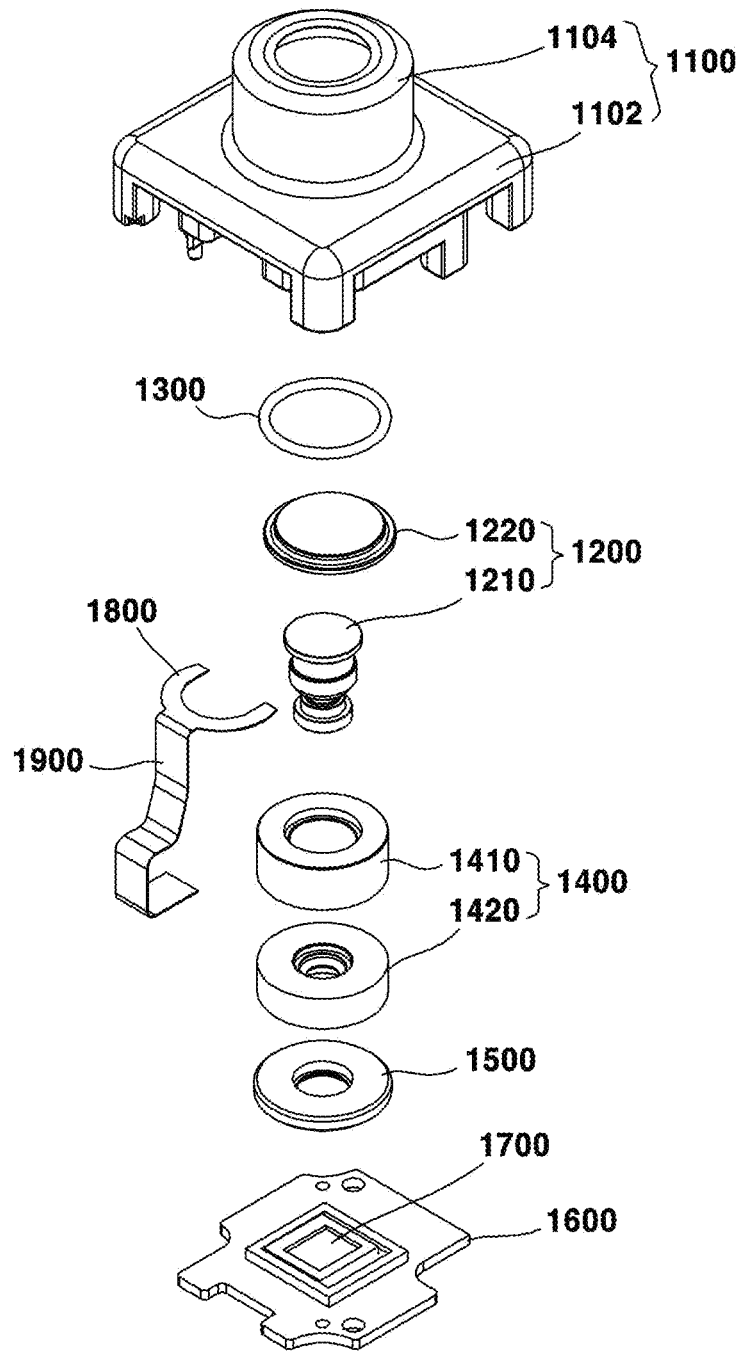
FIG. 11 is an exploded perspective view of a camera module according to a second embodiment of the present invention.
Figure 12:
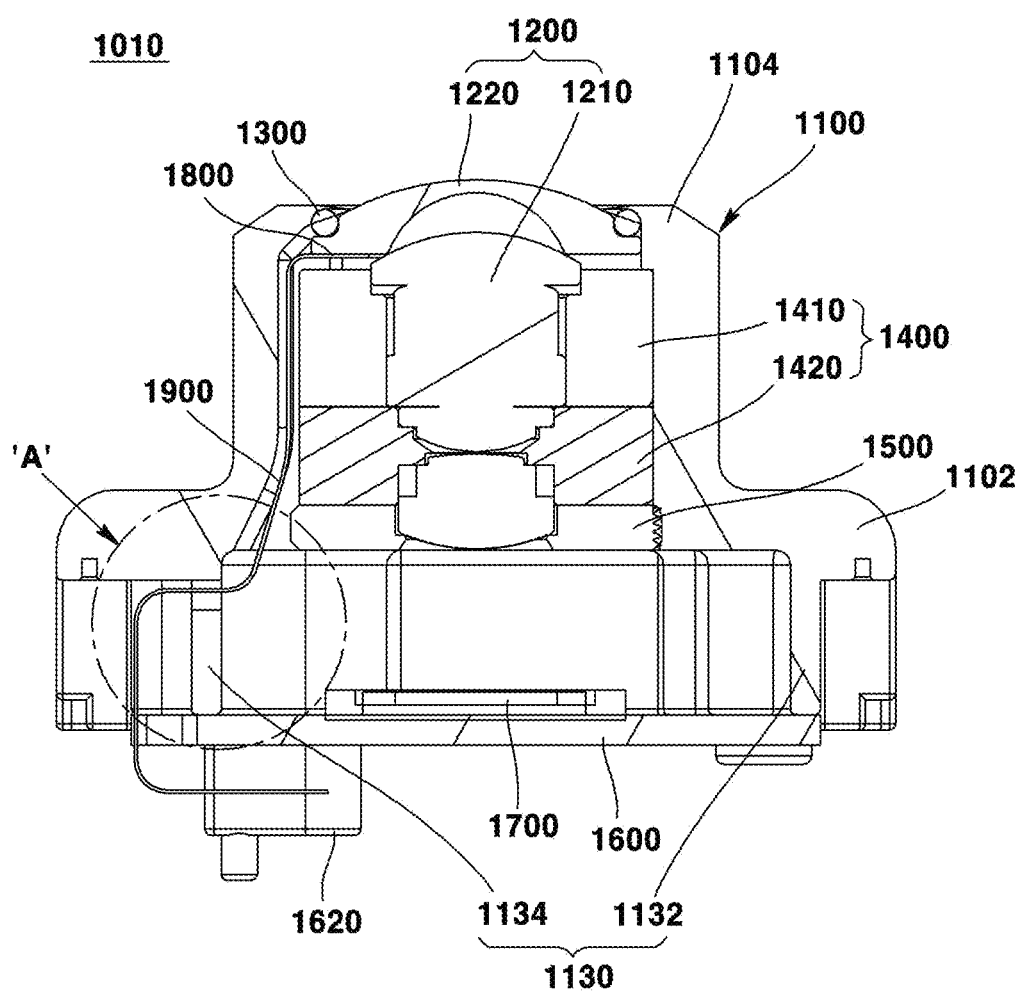
FIG. 12 is a cross-sectional view of a camera module according to a second embodiment of the present invention.
Figure 13:
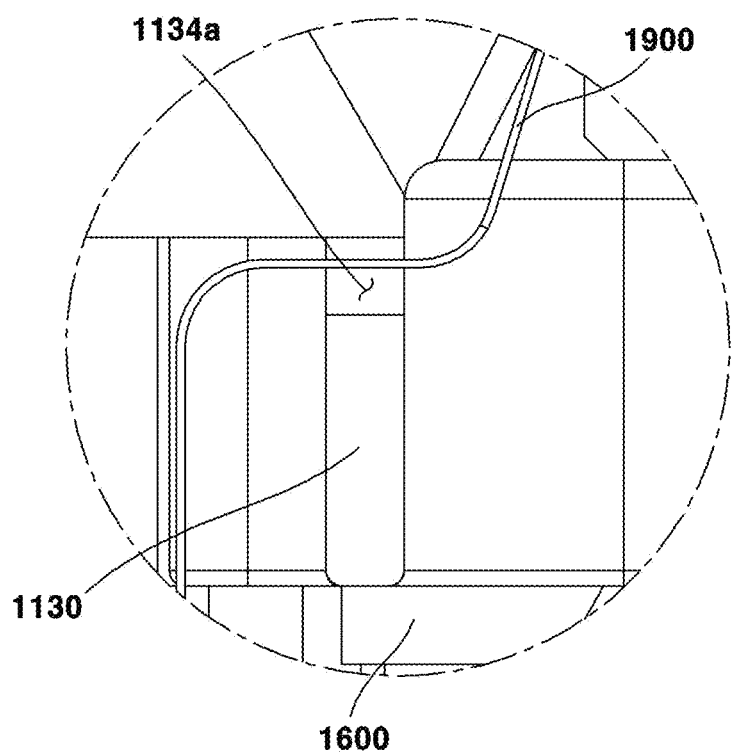
FIG. 13 is an enlarged view of part A of FIG. 12.
Figure 14:
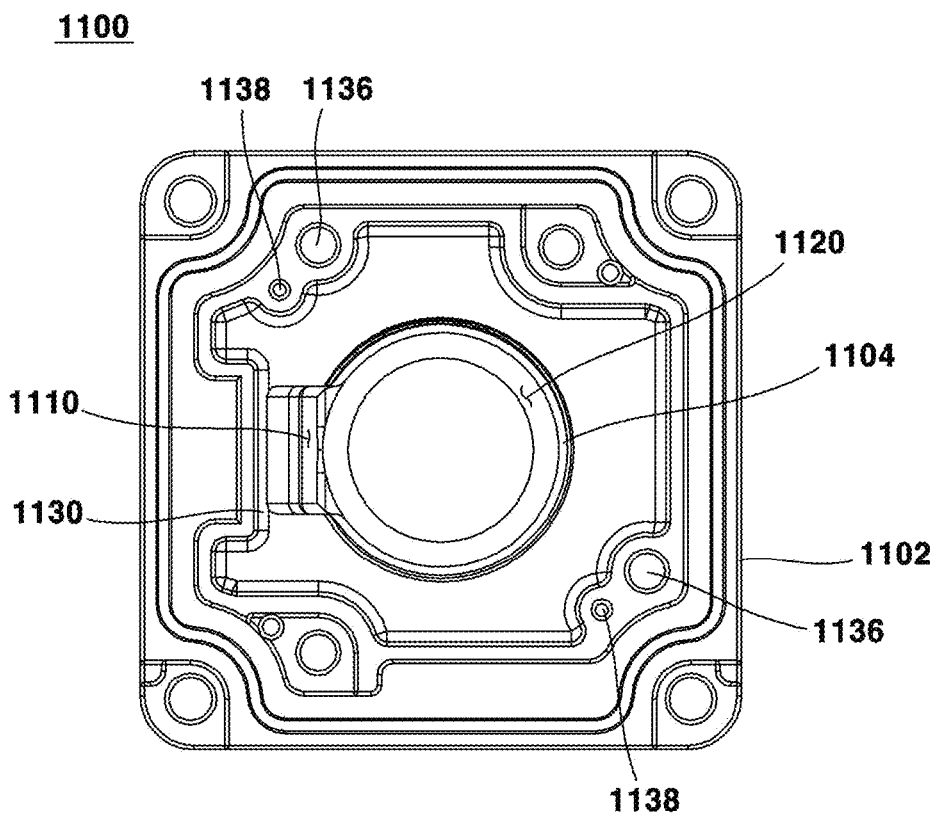
FIG. 14 is a bottom view of a housing according to a second embodiment of the present invention.
Figure 15:
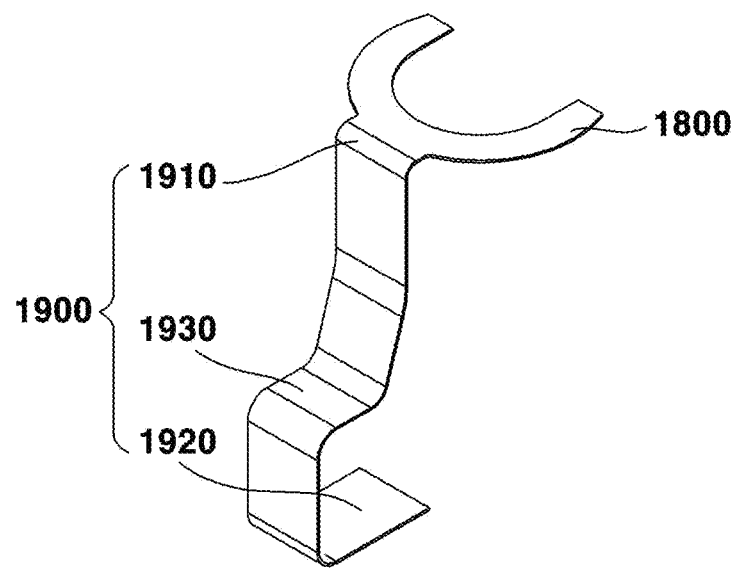
FIG. 15 is a perspective view of a heating member and a transmission member according to a second embodiment of the present invention.
Figure 16:
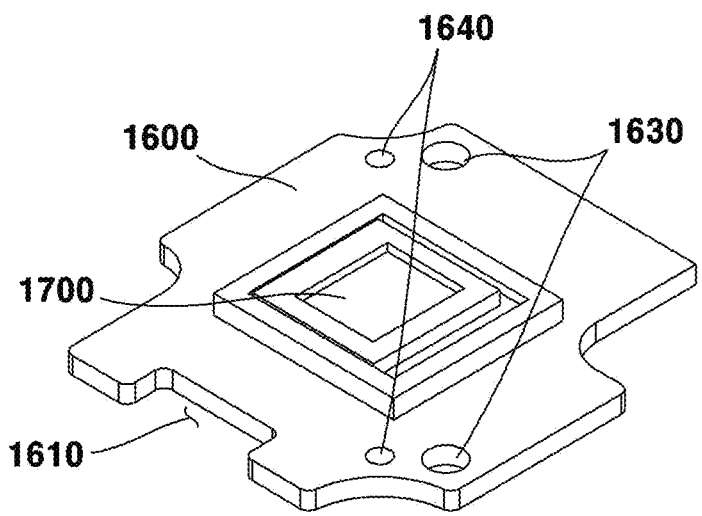
FIG. 16 is a perspective view of a substrate and an image sensor according to a second embodiment of the present invention.

FIG. 10 is a perspective view of a camera module according to a second embodiment of the present invention. FIG. 11 is an exploded perspective view of a camera module according to a second embodiment of the present invention. FIG. 12 is a cross-sectional view of a camera module according to a second embodiment of the present invention. FIG. 13 is an enlarged view of part A of FIG. 12. FIG. 14 is a bottom view of a housing according to a second embodiment of the present invention. FIG. 15 is a perspective view of a heating member and a transmission member according to a second embodiment of the present invention. FIG. 16 is a perspective view of a substrate and an image sensor according to a second embodiment of the present invention.

Referring to FIGS. 10 to 16, the camera module 1010 according to the second embodiment of the present invention may include a housing 1100, a lens module 1200, an O-ring 1300, a spacer 1400, fixing members 1500, a substrate 1600, an image sensor 1700, a heating member 1800, and a transmission member 1900, but it may be implemented except for some of these configurations, and does not exclude additional configurations.

The camera module 1010 according to the second embodiment of the present invention may include a housing 1100. The housing 1100 may form the outer appearance of the camera module 1010. In the housing 1100, a lens module 1200, an O-ring 1300, a spacer 1400, fixing member 1500, a substrate 1600, an image sensor 1700, a heating member 1800, and a transmission member 1900 may be arranged. The housing 1100 may be coupled with an additional housing (not shown) arranged on the lower part. The housing 1100 may include a body 1102, an accommodation unit 1104, and a partition wall 1130.

The housing 1100 may include a body 1102. The body 1102 may form the outer appearance of the camera module 1010. The body 1102 may be formed in a hexahedral shape with an open lower surface. An accommodation unit 1104 may be formed in the body 1102. The accommodation unit 1104 may be formed in the central region of the body 1102. The body 1102 may be integrally formed with the accommodation unit 1104. The body 1102 may be coupled with an additional housing that is arranged on the lower part. In the lower part of the body 1102, a first partition wall 1132 and a second partition wall 1134 may be formed.

The housing 1100 may include an accommodation unit 1104. The accommodation unit 1104 may be formed by being extended from the body 1102. The accommodation unit 1104 may be formed in the central region of the body 1102. The accommodation unit 1104 may be extended in the optical axis direction. The accommodation unit 1104 may be formed integrally with the body 1102. The accommodation unit 1104 may be formed in a cylindrical shape. The upper surface of the outermost lens 1220 may be arranged on the inner side surface of the accommodation unit 1104. The upper end of the accommodation unit 1104 is formed in a letter '¬' shape to inhibit the outermost lens 1220 from being released to the outside. The spacer 1400 may be arranged between the accommodation unit 1104 and at least one lens 1210. A separation space formed in a portion of the space between the accommodation unit 1104 and the spacer 1400 may be penetrated by the transmission member 1900.

A step portion may be formed on the inner side surface of the accommodation unit 1104. The upper surface of the spacer 1400 may be seated on a step portion formed on the inner side surface of the accommodation unit 1104. The edge region of the upper surface of the spacer 1400 may be seated on the step portion formed on the inner side surface of the accommodation unit 1104. Through this, it is possible to secure a space in which the outermost lens 1220 is arranged.

The accommodation unit 1104 may include an opening 1120. The opening 1120 being extended in the optical axis direction may be formed in the central region of the accommodation unit 1104. A lens module 1200 may be arranged in the accommodation unit 1104. The lens module 1200 may be arranged in the opening 1120 of the accommodation unit 1104. At least one lens 1210 may be arranged in the opening 1120 of the accommodation unit 1104. An outermost lens 1220 may be arranged in the upper part region of the opening 1120 of the accommodation unit 1104. The radius of the opening 1120 of the accommodation unit 1104 may be larger than the radius of the at least one lens 1210. The spacer 1400 may be arranged in the opening 1120 of the accommodation unit 1104. In some regions of the opening 1120 of the accommodation unit 1104, some regions of the transmission member 1900 may be arranged.

The housing 1100 may include a partition wall 1130. The partition wall 1130 may be formed in the lower part of the housing 1100. The partition wall 1130 may be protruded downward from the lower surface of the housing 1100. The partition wall 1130 may be coupled to the upper surface of the substrate 1600. The lower surface of the partition wall 1130 may be coupled to the upper surface of the substrate 1600. The partition wall 1130 may be overlapped with the edge region of the substrate 1600 in the optical axis direction. The lower surface of the partition wall 1130 may be in contact with the edge region of the substrate 1600. The lower surface of the partition wall 1130 may be formed in a shape corresponding to the edge region of the substrate 1600. The partition wall 1130 may seal the upper surface of the substrate 1600 from the outside. Through this, it is possible to inhibit foreign substances from penetrating into the image sensor 1700 or other elements. The partition wall 1130 may include a first partition wall 1132, a second partition wall 1134, a first coupling hole 1136, and a boss 1138.

The partition wall 1130 may include a first partition wall 1132. The first partition wall 1132 may be formed in the lower part of the body 1102. The first partition wall 1132 may be protruded downward from the lower surface of the body 1102. The first partition wall 1132 may be coupled to the upper surface of the substrate 1600. The first partition wall 1132 may be connected to the second partition wall 1134. The first partition wall 1132 may be integrally formed with the second partition wall 1134. The first partition wall 1132 may be in contact with the edge region of the upper surface of the substrate 1600. The first partition wall 1132 may be further spaced apart from the optical axis than the second partition wall 1134.

The partition wall 1130 may include a second partition wall 1134. The second partition wall 1134 may be formed in the lower part of the body 1102. The second partition wall 1134 may be protruded downward from the lower surface of the body 1102. The second partition wall 1134 may be coupled to the upper surface of the substrate 1600. The second partition wall 1134 may be connected to the first partition wall 1132. The second partition wall 1134 may be integrally formed with the first partition wall 1132. The second partition wall 1134 may be in contact with a region adjacent to the first groove 1610 among the edge region of the upper surface of the substrate 1600. The second partition wall 1134 may be arranged at a position closer to the optical axis than the first partition wall 1132.

The second partition wall 1134 may include a hole 1134a. The hole 1134a may be formed in the upper part region of the second partition wall 1134. The hole 1134a may be penetrated by the transmission member 1900. After some regions of the transmission member 1900 are arranged, the hole 1134a may be sealed by a sealing member (not shown). At this time, the sealing member may include a thermosetting resin such as epoxy. Through this, it is possible to inhibit foreign substances from being introduced into the image sensor 1700.

The partition wall 1130 may include a first coupling hole 1136. The first coupling hole 1136 may be formed on the lower surface of the partition wall 1130. The first coupling hole 1136 may be overlapped with the second coupling hole 1630 formed in the substrate 1600 in the optical axis direction. The first coupling hole 1136 may be formed in a shape corresponding to the second coupling hole 1630 formed in the substrate 1600. The first coupling hole 1136 may be penetrated through by a coupling member, for example, a screw, together with the second coupling hole 1630 formed in the substrate 1600. Through this, the lower surface of the partition wall 1130 may be coupled to the upper surface of the substrate 1600. The first coupling hole 1136 may include two first coupling holes 1136. The two first coupling holes 1136 may be formed at positions symmetrical to each other with respect to the optical axis. Through this, bonding stability between the lower surface of the partition wall 1130 and the upper surface of the substrate 1600 may be enhanced.

The partition wall 1130 may include a boss 1138. The boss 1138 may be formed on the lower surface of the partition wall 1130. The boss 1138 may be overlapped with the through hole 1640 formed in the substrate 1600 in the optical axis direction. The boss 1138 may be formed in a shape corresponding to the through hole 1640 formed in the substrate 1600. The boss 1138 may be inserted into the through hole 1640 formed in the substrate 1600. Through this, it is possible to guide the positioning of the housing 1100 and the substrate 1600 with respect to each other. Boss 1138 may include two bosses 1138. The two bosses 1138 may be formed at positions symmetrical to each other with respect to the optical axis. Through this, the positioning force of the housing 1100 and the substrate 1600 with respect to each other may be enhanced.

The camera module 1010 according to the second embodiment of the present invention may include a lens module 1200. The lens module 1200 may be arranged in the housing 1100. The lens module 1200 may be arranged in the accommodation unit 1104 of the housing 1100. The lens module 1200 may be arranged in the opening 1120 of the accommodation unit 1104 of the housing 1100. The lens module 1200 may include at least one lens 1210 and an outermost lens 1220.

The lens module 1200 may include at least one lens 1210. The at least one lens 1210 may be arranged in the accommodation unit 1104. The radius of the at least one lens 1210 may be smaller than the radius of the opening 1120 of the accommodation unit 1104. The at least one lens 1210 may be arranged on one side or below the outermost lens 1220. The at least one lens 1210 may be overlapped with the spacer 1400 in a direction perpendicular to the optical axis. The at least one lens 1210 may be supported by the spacer 1400. The at least one lens 1210 may be fixed and supported by the fixing member 1500. The at least one lens 1210 may include a plurality of lenses having a step difference from each other. A plurality of lenses having a step difference may be respectively supported by a plurality of spacers 1410 and 420. Each lens of the at least one lens 1210 may be made of a synthetic resin material, a glass material, or a quartz material, but is not limited thereto and may be made of various materials.

The lens module 1200 may include an outermost lens 1220. The outermost lens 1220 may be arranged in the upper part of the accommodation unit 1104. The outermost lens 1220 may seal the opening 1120 of the accommodation unit 1104. At least a portion of the upper surface of the outermost lens 1220 may be in contact with the upper part region of the inner side surface of the accommodation unit 1104. At least a portion of the lower surface of the outermost lens 1220 may be in contact with the upper surface of the at least one lens 1210. A radius of the outermost lens 1220 may be larger than a radius of the at least one lens 1210. The outermost lens 1220 may be fixed to the accommodation unit 1104 by an upper end of the accommodation unit 1104 and at least one lens 1102. The outermost lens 1220 may be made of a synthetic resin material, a glass material, or a quartz material, but is not limited thereto and may be made of various materials.

The camera module 1010 according to the second embodiment of the present invention may include an O-ring 1300. The O-ring 1300 may be arranged between the housing 1100 and the lens module 1200. The O-ring 1300 may be arranged between the outermost lens 1220 and the accommodation unit 1104 of the housing 1100. The O-ring 1300 may be formed of a material having elasticity. The O-ring 1300 may be formed in a ring shape. Through this, it is possible to inhibit damage to components that may occur when an upper end of the accommodation unit 1104 of the housing 1100 presses the outermost lens 1220 of the lens module 1200 downward. In addition, the O-ring 1300 may have a waterproof function that inhibits moisture from entering the camera module 1010 through the accommodation unit 1104.

The camera module 1010 according to the second embodiment of the present invention may include a spacer 1400. The spacer 1400 may be arranged in the housing 1100. The spacer 1400 may be arranged in the accommodation unit 1104 of the housing 1100. The spacer 1400 may be arranged in the opening 1120 of the accommodation unit 1104 of the housing 1100. The spacer 1400 may be arranged between the inner surface of the accommodation unit 1104 of the housing 1100 and the at least one lens 1210 to support the at least one lens 1210. The spacer 1400 may be arranged between the inner surface of the accommodation unit 1104 of the housing 1100 and the lens module 1200.

The spacer 1400 may be formed of an aluminum material. Through this, heat loss of the heating member 1800 may be reduced, and thus the amount of heat flowing into the outermost lens 1210 may be enhanced.

A separation space 1110 may be formed on the inner surface of the spacer 1400 and the accommodation unit 1104 of the housing 1100. The spacer 1400 and the separation space 1110 formed on the inner surface of the accommodation unit 1104 of the housing 1100 may be penetrated by the transmission member 1900.

The spacer 1400 may include a plurality of spacers 1410 and 420. When the at least one lens 1210 includes a plurality of lenses having a step difference from each other, the plurality of lenses may be supported through a plurality of spacers 1410 and 420, respectively.

A camera module 1010 according to the second embodiment of the present invention may include a fixing member 1500. The fixing member 1500 may be arranged in the housing 1100. The fixing member 1500 may be arranged in the accommodation unit 1104 of the housing 1100. The fixing member 1500 may be arranged between the inner surface of the accommodation unit 1104 of the housing 1100 and the at least one lens 1210. The fixing member 1500 may be arranged on one side or the lower part of the spacer 1400. The upper surface of the fixing member 1500 may be in contact with the lower surface of the spacer 1400. The outer side surface of the fixing member 1500 may be coupled to the inner side surface of the accommodation unit 1104 of the housing 1100. The outer side surface of the fixing member 1500 may be screw-coupled or tap-coupled to the inner side surface of the accommodation unit 1104 of the housing 1100. In this case, a screw thread corresponding to a screw thread formed on the inner side surface of the accommodation unit 1104 of the housing 1100 may be formed on the outer side surface of the fixing member 1500. Through this, the positions of the lens module 1200 and the spacer 1400 may be fixed.

The radius of the fixing member 1500 may be larger than the radius of the spacer 1400. Through this, the spacer 1400 may be stably supported. The lower part region of the fixing member 1500 may support at least one lens 1210. A lower end of the inner side surface of the fixing member 1500 may be formed in a letter 'ㄴ' shape to support a lower end of the at least one lens 1210. Through this, the at least one lens 1210 may be stably supported.

A separation space 1110 may be formed on the inner surface of the fixing member 1500 and the accommodation unit 1104 of the housing 1100. The separation space 1110 formed on the inner surface of the fixing member 1500 and the accommodation unit 1104 of the housing 1100 may be penetrated by the transmission member 1900.

In the second embodiment of the present invention, the fixing member 1500 is arranged between at least one lens 1210 and the inner side surface of the accommodation unit 1104 as an example, but the fixing member 1500 may be arranged below the spacer 1400 and the at least one lens 1210. In this case, the lower end of the spacer 1400 and the lower end of the at least one lens 1210 may be arranged on a same plane.

The camera module 1010 according to the second embodiment of the present invention may include a substrate 1600. The substrate 1600 may be arranged in the housing 1100. The substrate 1600 may be arranged on the lower part of the housing 1100. The substrate 1600 may be coupled to the lower part of the housing 1100. The substrate 1600 may be coupled to the lower surface of the partition wall 1130 of the housing 1100. The edge region of the upper surface of the substrate 1600 may be overlapped with the partition wall 1130 in the optical axis direction. The edge region of the upper surface of the substrate 1600 may be in contact with the lower surface of the partition wall 1130. The upper surface of the substrate 1600 may be sealed from the outside by the partition wall 1130. Through this, it is possible to inhibit foreign substances from penetrating into the image sensor 1700 or other elements arranged on the upper surface of the substrate 1600.

The substrate 1600 may be electrically connected to the image sensor 1700. The image sensor 1700 may be arranged on the substrate 1600. The image sensor 1700 may be arranged on the upper surface of the substrate 1600. The image sensor 1700 may be mounted on the upper surface of the substrate 1600. The substrate 1600 may be electrically connected to the transmission member 1900. The substrate 1600 may be electrically connected to a connector 1620. The connector 1620 may be arranged on the lower surface of the substrate 1600. The connector 1620 may be mounted on the lower surface of the substrate 1600. The substrate 1600 may be electrically connected to the transmission member 1900 through the connector 1620.

The substrate 1600 may include a printed circuit board (PCB). The substrate 1600 may include a flexible printed circuit board (FPCB).

The substrate 1600 may include a groove 1610. The groove 1610 may be formed on a side surface of the substrate 1600. The groove 1610 may be concavely formed in the side surface of the substrate 1600. The groove 1610 may be spaced apart from the image sensor 1700. The groove 1610 may be penetrated by the transmission member 1900. The cross-section of the groove 1610 may be formed in a rectangular shape. The groove 1610 may not be overlapped with the accommodation unit 1104 of the housing 1100 in the optical axis direction. The groove 1610 may be located outside the partition wall 1130. Specifically, the groove 1610 may be located outside the second partition wall 1134.

The substrate 1600 may include a second coupling hole 1630. The second coupling hole 1630 may be formed through the substrate 1600. The second coupling hole 1630 may be overlapped with the first coupling hole 1136 formed in the partition wall 1130 in the optical axis direction. The second coupling hole 1630 may be formed in a shape corresponding to the first coupling hole 1136 formed in the partition wall 1130. The second coupling hole 1630 may be penetrated through by a coupling member, for example, a screw, together with the first coupling hole 1136 formed in the partition wall 1130. Through this, the upper surface of the substrate 1600 may be coupled to the lower surface of the partition wall 1130. The second coupling hole 1630 may include two second coupling holes 1630. The two second coupling holes 1630 may be formed at positions symmetrical to each other with respect to the optical axis. Through this, bonding stability between the upper surface of the substrate 1600 and the lower surface of the partition wall 1130 may be enhanced.

The substrate 1600 may include a through hole 1640. The through hole 1640 may be formed through the substrate 1600. The through hole 1640 may be overlapped with the boss 1138 formed in the partition wall 1130 in the optical axis direction. The through hole 1640 may be formed in a shape corresponding to the boss 1138 formed in the partition wall 1130. The through hole 1640 may be penetrated by the boss 1138 formed in the partition wall 1130. Through this, it is possible to guide the positioning of the housing 1100 and the substrate 1600 with respect to each other. The through hole 1640 may include two through holes 1640. The two through holes 1640 may be formed at positions symmetrical to each other with respect to the optical axis. Through this, the positioning force of the housing 1100 and the substrate 1600 with respect to each other may be enhanced.

The camera module 1010 according to the second embodiment of the present invention may include an image sensor 1700. The image sensor 1700 may be arranged on the upper surface of the substrate 1600. The image sensor 1700 may be mounted in a central region of the upper surface of the substrate 1600. The image sensor 1700 may be arranged below the lens module 1200. The image sensor 1700 may be spaced apart from the groove 1610. The image sensor 1700 may be electrically connected to the substrate 1600. For example, the image sensor 1700 may be coupled to the substrate 1600 by a surface mounting technology (SMT). As another example, the image sensor 1700 may be coupled to the substrate 1600 by a flip chip technology.

The camera module 1010 according to the second embodiment of the present invention may include a heating member 1800. The heating member 1800 may be arranged in the lens module 1200. The heating member 1800 may be arranged on one side of the outermost lens 1220. The heating member 1800 may be arranged on the lower surface of the outermost lens 1220. The heating member 1800 may be formed of a transparent material. The heating member 1800 may be formed in a shape that does not interfere with light passing through the lens module 1200. For example, the heating member 1800 may be formed in a C-shape.

The heating member 1800 may be electrically connected to the transmission member 1900. The heating member 1800 may receive power from the substrate 1600 through the transmission member 1900 to generate heat. The heating member 1800 may be a transparent heating film coated with indium thin oxide (ITO) having conductivity capable of generating heat by a self-resistance component. The heating member 1800 may be formed by, for example, a coating process or a deposition process of an indium tin oxide material. However, this is only an example, and the material of the heating member 1800 is not limited thereto and may be variously changed as long as it is a material that can generate heat by supplying current.

The camera module 1010 according to the second embodiment of the present invention may include a transmission member 1900. The transmission member 1900 may electrically connect the heating member 1800 and the substrate 1600. The transmission member 1900 may connect the heating member 1800 and the connector 1620. The transmission member 1900 may be electrically connected to the heating member 1800. The transmission member 1900 may be electrically connected to the substrate 1600 through the connector 1620. The transmission member 1900 may supply current from the substrate 1600 to the heating member 1800. The transmission member 1900 may be bent at least in part. The transmission member 1900 may sequentially pass through the separation space 1110, the hole 1134a of the partition wall 1130, and the groove 1620 of the substrate 1600. The transmission member 1900 may be a flexible printed circuit board (FPCB).

The transmission member 1900 may include a first region 1910 connected to the heating member 1800, a second region 1920 connected to the connector 1620, and a third region 1930 connecting the first region 1910 and the second region 1920. At least a part of the third region 1930 may be bent. The third region 1930 may sequentially pass through the separation space 1110, the hole 1134a of the partition wall 1130, and the groove 1620 of the substrate 1600. Through this, space efficiency can be enhanced.

According to the camera module 1010 according to the second embodiment of the present invention, it is possible to inhibit the occurrence of condensation including frost on the outermost lens 1220 through the heating member 1800.

In addition, according to the camera module 1010 according to the second embodiment of the present invention, it is possible to inhibit foreign substances from penetrating into the image sensor 1700 through the partition wall 1130, and it is possible to enhance space efficiency.

In addition, according to the camera module 1010 according to the second embodiment of the present invention, it is possible to increase space efficiency and reduce heat loss through the spacer 1400.

It is arranged in a way that the outermost lens 1220 is fixed by the accommodation unit 1104 without using a separate case to assemble the camera module 1010. Through this, the assembly process of the camera module 1010 may be reduced. In addition, the cross-sectional area of the camera module 1010 can be reduced, which is effective in reducing heat loss of the camera module 1010.

Modified embodiments according to the present embodiment may include some configurations of the first embodiment and some configurations of the second embodiment together. That is, the modified embodiments may include the first embodiment, but some configurations of the first embodiment may be omitted, and may include some configurations of the corresponding second embodiment. Alternatively, the modified embodiments may include the second embodiment, but some configurations of the second embodiment are omitted and include some configurations of the corresponding first embodiment.

Although the embodiments of the present invention have been described above with reference to the accompanying drawings, those skilled in the art to which the present invention belongs will appreciate that the present invention can be implemented in other specific forms without changing the technical spirit or essential features. Therefore, it should be understood that the embodiments described above are illustrative in all respects and not restrictive.

The invention claimed is:

1. A camera module comprising:
a housing comprising a body and an accommodation unit extending in an optical axis direction from a central region of the body;
an outermost lens disposed on an upper part of the accommodation unit;
a substrate coupled to a lower part of the housing;
a connector coupled to a lower surface of the substrate;
a heating member disposed on one side of the outermost lens; and
a transmission member connecting the heating member and the connector,
wherein the substrate comprises a first groove formed on a side surface thereof and being penetrated by the transmission member,
wherein the housing comprises a partition wall extending from a lower surface thereof and coupled to an upper surface of the substrate, and
wherein the first groove is located outside the partition wall and the partition wall is in contact with a region adjacent to the first groove among edge regions of the upper surface of the substrate.

2. The camera module according to claim 1, wherein the partition wall is overlapped with one of the edge regions of the upper surface of the substrate in the optical axis direction.

3. The camera module according to claim 2, wherein the one of the edge regions of the upper surface of the substrate is in contact with a lower surface of the partition wall, and
wherein the upper surface of the substrate is sealed from the outside by the partition wall.

4. The camera module according to claim 1, wherein the partition wall comprises a hole being penetrated through by the transmission member.

5. The camera module according to claim 4, wherein the transmission member comprises a first region connected to the heating member, a second region connected to the connector, and a third region connecting the first region and the second region.

6. The camera module according to claim 5, wherein at least a portion of the third region is bent.

7. A camera module comprising:
a housing comprising a body and an accommodation unit extending from a central region of the body in an optical axis direction;
an outermost lens disposed on an upper part of the accommodation unit;
a substrate coupled to a lower part of the housing;
a heating member disposed on one side of the outermost lens; and
a transmission member connecting the heating member and the substrate;
wherein the accommodation unit comprises a hole extending in an optical axis direction,
wherein the substrate comprises a first groove formed concave inwardly from a side surface,
wherein the transmission member passes through the hole and the first groove,
wherein the housing comprises a partition wall extending downward from a lower surface thereof and coupled to an upper surface of the substrate, and
wherein the first groove is located outside the partition wall and the partition wall is in contact with a region adjacent to the first groove among edge regions of the upper surface of the substrate.

8. The camera module according to claim 4, comprising at least one lens disposed in the accommodation unit and disposed on one side of the outermost lens,
wherein the hole is spaced apart from the at least one lens in a direction perpendicular to the optical axis, and
wherein the at least one lens is screw-coupled to an inner circumferential surface of the accommodation unit.

9. The camera module according to claim 8, wherein the accommodation unit comprises a second groove formed on a lower surface, and
wherein the second groove is overlapped with the at least one lens in a direction perpendicular to the optical axis.

10. The camera module according to claim 1, comprising a retainer coupled to an upper portion of the accommodation unit to fix the outermost lens.

11. The camera module according to claim 10, comprising an O-ring disposed between the outermost lens and the retainer.

12. The camera module according to claim 7, wherein the partition wall is overlapped with one of the edge regions of the upper surface of the substrate in the optical axis direction.

13. The camera module according to claim 12, wherein the one of the edge regions of the upper surface of the substrate is in contact with a lower surface of the partition wall, and
wherein the upper surface of the substrate is sealed from the outside by the partition wall.

14. The camera module according to claim 7, comprising at least one lens disposed on the accommodation unit and disposed on one side of the outermost lens,
wherein the hole is spaced apart in a direction perpendicular to the optical axis, and
wherein the at least one lens is screw-coupled to an inner circumferential surface of the accommodation unit.

15. The camera module according to claim 14, wherein the accommodation unit comprises a second groove formed on a lower surface, and
wherein the second groove is overlapped with the at least one lens in a direction perpendicular to the optical axis.

16. The camera module according to claim 7, comprising a connector disposed on a lower surface of the substrate.

17. The camera module according to claim 16, wherein the transmission member comprises a first region connected to the heating member, a second region connected to the connector, and a third region connecting the first region and the second region.

18. The camera module according to claim 17, wherein at least a portion of the third region of the transmission member is bent.

19. The camera module according to claim 7, comprising:
   a retainer coupled to an upper part of the accommodation unit to fix the outermost lens; and
   an O-ring disposed between the outermost lens and the retainer.

* * * * *